(No Model.)
T. LANAHAN.
AUTOMATIC VALVE FOR AIR BRAKES.
No. 371,078. Patented Oct. 4, 1887.
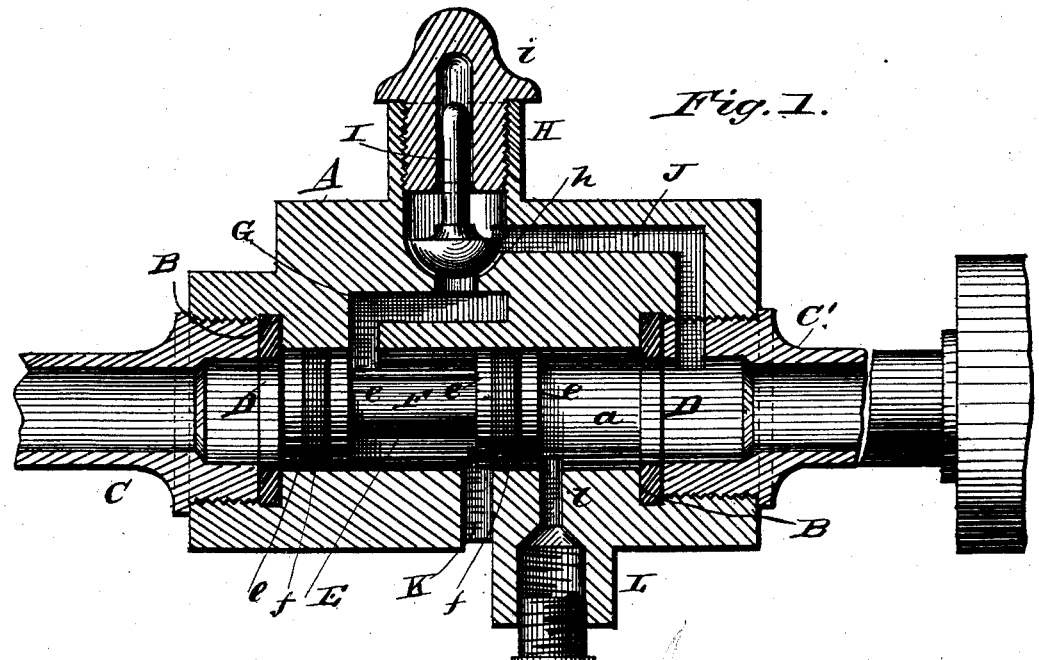
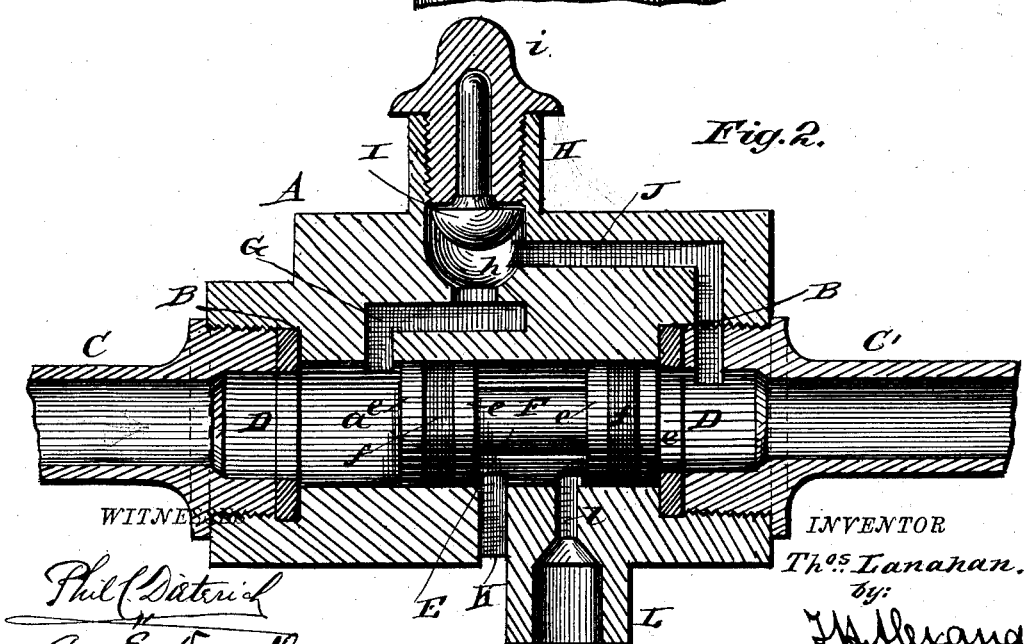
WITNESSES
Phil C. Dietrich
A. E. Dowell
INVENTOR
Thos Lanahan.
by:
J. K. Alexander
Attorney

UNITED STATES PATENT OFFICE.

THOMAS LANAHAN, OF LOUISVILLE, KENTUCKY, ASSIGNOR TO HIMSELF, GEORGE W. ROBERTS, AND CHARLES H. RICE, ALL OF SAME PLACE.

AUTOMATIC VALVE FOR AIR-BRAKES.

SPECIFICATION forming part of Letters Patent No. 371,078, dated October 4, 1887.

Application filed April 16, 1887. Serial No. 235,011. (No model.)

*To all whom it may concern:*

Be it known that I, THOMAS LANAHAN, of Louisville, in the county of Jefferson and State of Kentucky, have invented certain new and useful Improvements in Automatic Valves for Air-Brakes; and I do hereby declare that the following is a full, clear, and exact description thereof, reference being had to the accompanying drawings, and to the letters of reference marked thereon, which form part of this specification, in which—

Figure 1 is a central vertical longitudinal section through my improved automatic valve, showing it applied in position for use in connection with the air-brake cylinder of a railway-car, the brakes being set. Fig. 2 is a similar view showing the position of the parts of the valve when the brakes are released.

This invention relates to improvements in valves for controlling the air-brake mechanisms of railway-cars, its objects being to provide a valve which will be operated by the pressure of the air or steam used in applying the brakes in the ordinary systems, in which a cylinder and piston are employed to actuate the brakes, and which will allow the direct outward escape of the air from the cylinders through a suitable port in the valve when the inflowing current of air or steam is cut off by the engineer, thus rendering the handling of a large number of cars equipped with such brakes and valves possible and speedy.

The invention consists in the novel construction and arrangement of the valve parts, hereinafter described, illustrated in the drawings, and particularly specified in the claim.

Referring to the drawings by letter, A designates the valve, which consists of a tubular body having its bore *a* enlarged and shouldered at its ends, forming shoulders B B, the enlarged portion of the bore being screw-threaded, as shown, for the engagement of annular flanged nuts C C', suitably screw-threaded on their outer surfaces to the inner side of their flanges to engage the screw-threads in the ends of bore *a*.

D D designate annular collars, made preferably of rubber or other suitable material and seated against the shoulders B, and secured by the impingement of the inner ends of nuts C C', as shown. The openings in nuts C C' and collars D are of smaller diameter than the bore *a*, so that the collars D are seats for impact of the heads of a valve-stem, E, and cushion the same, as is evident. The stem E is composed of two annular blocks or heads, *e e*, about equal in diameter to the bore *a*, and these heads are connected centrally and held rigidly by a short rod, F, of less diameter than bore *a*, so that an annular chamber is formed around rod F in bore *a*, as shown. The heads *e e* of the valve-stem are annularly grooved on their peripheries, and in the grooves are placed packing-rings *f*, of suitable metal, to prevent undue wear of the heads against the sides of bore *a*. The stem E is shorter than the length of bore *a* between the opposite collars D D, and at a point in the upper surface of bore *a* is formed a port-channel, G, which opens into bore *a* just in front of the head *e* of the stem E when the stem is lying against the collar D of nut C'. This port G extends within the upper wall of bore *a* and opens into the lower end of a valve-seat, *h*, formed in a vertically-rising internally-threaded tube, H, which may be formed integral with body A.

I designates a puppet-valve in seat *h* and closing the mouth of port G against back-pressure, but rising to permit the inflow of air or steam therefrom. The valve I is kept in place on its seat by means of the annular chambered nut *i*, which is suitably threaded to engage the threads of tube H and close the outer end of the same.

J designates a port-channel leading from the valve-seat *h* above the mouth of port G through the walls of bore *a*, and opening through the walls of bore *a* and a corresponding opening in the threaded portion of the nut C' outside of collar D, so that when the stem E is in the position shown in Fig. 2 air entering bore *a* on the side next port G will be conducted thereby through valve-seat *h* and port J to the opposite end of the valve and be delivered therefrom into any proper receiver.

K designates an opening passing through the wall of valve A and communicating with bore *a* centrally between the collars D D. L designates a tube depending from valve A between the opening K and collar D on the side next port J.

*l* designates a port opening through tube L into bore *a* at a point sufficiently to the inside of its adjoining collar D to permit the adjoining head *e* of stem E to pass beyond the port *l* and permit the latter to communicate through the annular chamber between the heads of the stem with the opening K, for a purpose hereinafter shown, the length of stem E being such as to permit this adjustment of the parts. The length of bore *a* and stem E are also so determined that when stem E is shifted to the end of the bore next nut C the ports G and K and ports J and *l* communicate, the communication between ports G and J being cut off by puppet I.

The operation of the valve is as follows: The end C of the valve is connected to a delivery-pipe communicating with the air-pump or boiler of the engine and controlled by the engineer. The end C' is connected to the storage tank or chest, which chest is connected to the end C of a valve A on a succeeding car, so that air or steam under pressure can pass through the valves to every car of a train, as usual. The tube L is connected to the brake-cylinder M by a suitable coupling, and at the proper end thereof to cause the requisite movement of the piston therein to apply the brakes. Now, the engineer permitting the escape or passage of air or steam through the connecting-pipes to valve A, and through them, as described, to the various storage-tanks on the several cars, the air in passing through valves under pressure will shift stem E to the side of the valve next nut C', and will then pass through port G, lift puppet I, pass through port J, and out through nut C' and its connections to the storage-tanks, as described. This is the condition of the valves when the brakes are not applied. To apply the brakes the engineer cuts off the supply of air to the valves, and at the same time permits the escape of the air from the pipe leading to the first valve A next the engine into the atmosphere. This destroys the equilibrium of pressure in the pipes and tanks of the several cars and causes the reflow of air into valves A through the ends C', where its backward passage through port J is stopped by puppet I. It then impinges forcibly against the head of stem E and moves the same to the opposite end of the valve, thereby forming a communication through port *l* with the brake-cylinder, and, entering same, actuates the piston and shuts down the brakes, the same operation taking place about simultaneously on every car of the train, rendering the stoppage thereof more certain and swift. Then when the engineer wishes to release the brakes he again connects the first valve with the pump, and, the resistance of the air being reduced in the several tanks by its expansion into the brake-cylinders, the stems E are forced back to the sides of nuts C and communication established through the valves between ports G and J, as described. The reshifting of stem E restores communication between port *l* and opening K, as described, and the air passes directly from the brake-cylinder through said ports, and, opening into the atmosphere, quickly releases the brakes, and this action is the same with all the valves and brake-cylinders of the several cars.

The cushion-collars D D prevent jar or breaking of the heads of the stem E, and relieve impact of the same from nuts C C'.

It is obvious from the foregoing that any number of cars having brake-cylinders equipped with these valves can be controlled by the engineer, and that the release of one valve will be about simultaneous with the release of the others, as the release of air from one valve will similarly affect the remaining valves with which it is connected, so that the brakes are set or loosened without appreciable loss of time. The valves also, not requiring any springs to assist their operation, can be made very light and at little cost, and as all the wearing parts are of metal they will last for years without need of attention or regulation and always be reliable in action.

Having described my invention, I claim—

The triple valve A, composed of an annular body provided with a bore, *a*, enlarged and screw-threaded at its ends, and having the communicating passages or ports G and J formed in its wall and controlled by a puppet-valve, I, the annular nuts C C', engaged in the ends of bore *a*, and communicating, respectively, with the air delivery and storage tanks, the nut C' being provided with an opening in its side communicating with the port J, the ports K and *l*, communicating about centrally with bore *a*, and the port *l* also communicating with the brake-cylinder, and the valve E, playing in bore *a* and composed of heads *e e* and connecting-rod F, all substantially as and for the purpose specified.

In testimony that I claim the foregoing as my own I affix my signature in presence of two witnesses.

THOS. LANAHAN.

Witnesses:
J. F. DAVIDSON,
JOSEPH M. SKAIN.